UNITED STATES PATENT OFFICE.

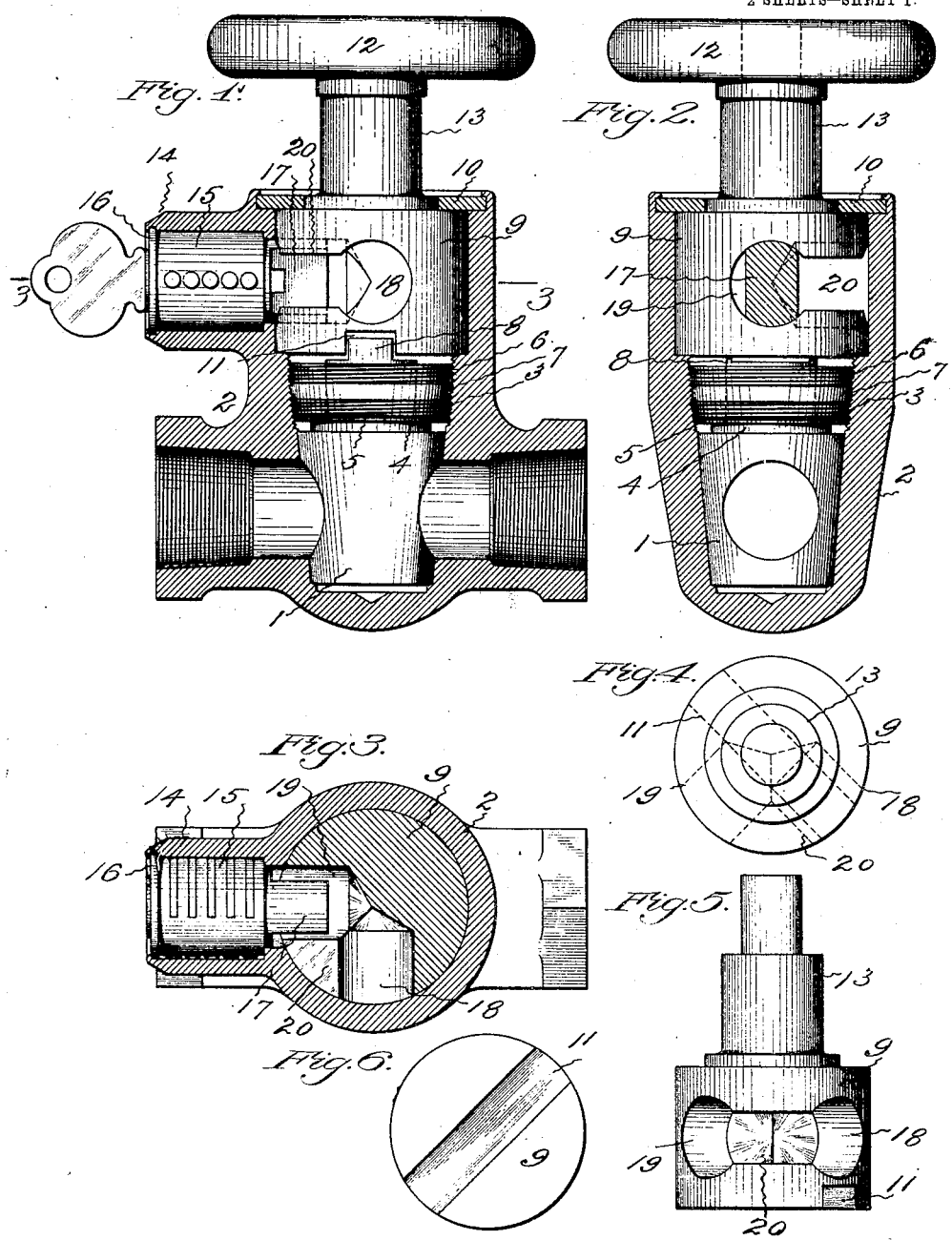

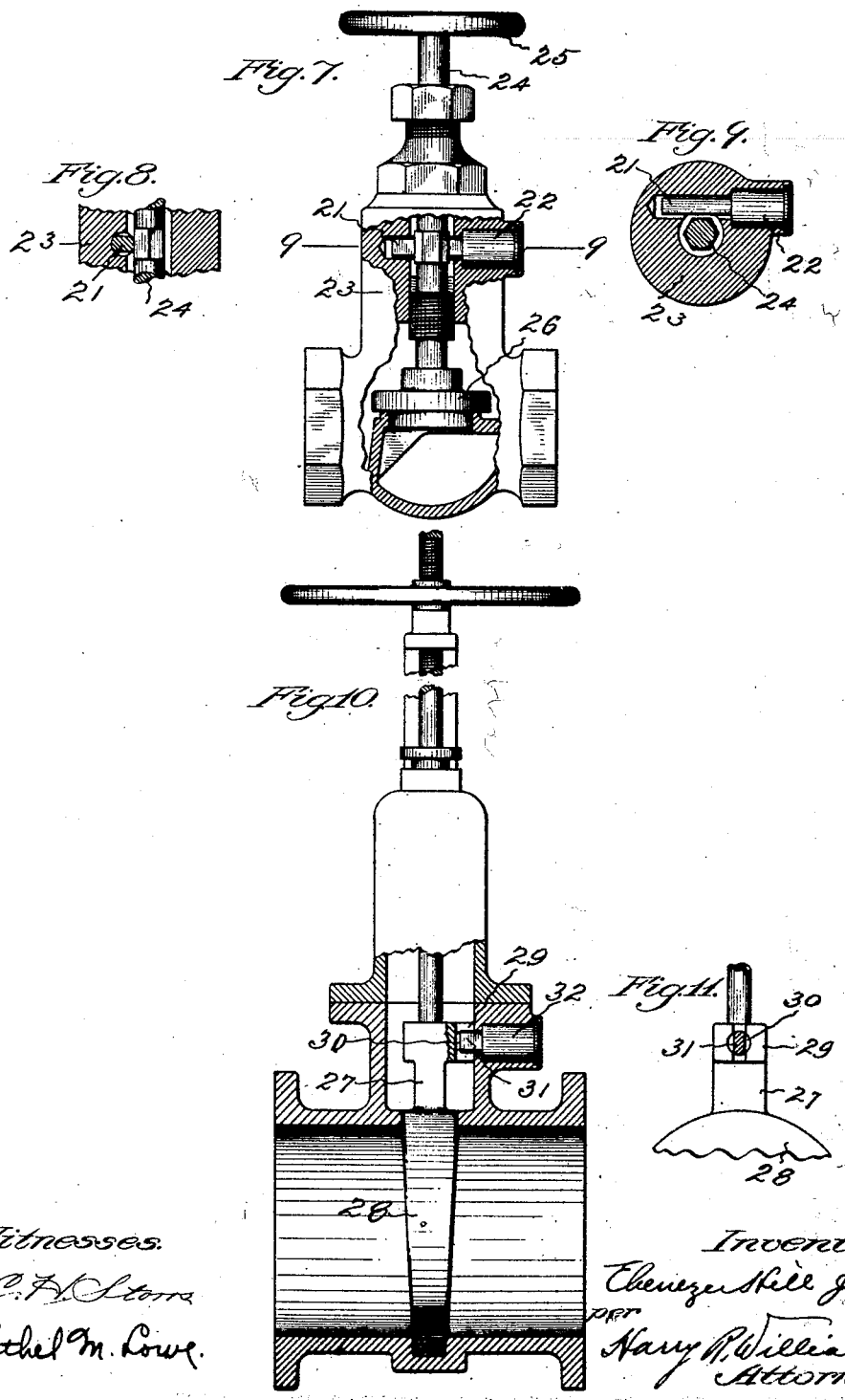

EBENEZER HILL, JR., OF NORWALK, CONNECTICUT.

STOP-VALVE.

No. 835,523.  Specification of Letters Patent.  Patented Nov. 13, 1906.

Application filed November 18, 1905. Serial No. 288,045.

*To all whom it may concern:*

Be it known that I, EBENEZER HILL, Jr., a citizen of the United States, residing at Norwalk, in the county of Fairfield and State of Connecticut, have invented a new and useful Stop-Valve, of which the following is a specification.

This invention relates to a stop-valve for liquids and gases which has a lock for preventing unauthorized tampering with the valve.

The invention is particularly designed for stop-valves of large size, either of the rotary-plug, globe, or straightway-gate type, although it is applicable, of course, to valves of small size and of other types than those shown.

The object of the invention is to provide a simple, strong, and durable construction in which the lock is so arranged that it does not interfere with the tight closing or the ready working of the valve.

A valve which embodies this invention has means for opening and closing the valve and a lock that can be manipulated by the proper key for fastening the opening and closing means against movement.

In the accompanying drawings, Figure 1 shows the invention applied to a rotary-plug cock, the casing being cut in central section in order to expose the interior. Fig. 2 shows the same cock, with the section taken on a plane at right angles to that of Fig. 1. Fig. 3 is a horizontal section of the cock on the plane indicated by the line 3 3 on Fig. 1. Fig. 4 is a plan of the barrel to which the handle is attached and which is connected with the plug. Fig. 5 shows a side elevation of the barrel. Fig. 6 shows a bottom view of the barrel. Fig. 7 shows the invention applied to a globe-valve. Fig. 8 shows a small portion of the spindle and the locking-bolt of the globe-valve. Fig. 9 shows a horizontal section of the spindle and the lock on the section, taken on the plane indicated by the line 9 9 on Fig. 7. Fig. 10 shows the invention applied to a rising gate-valve. Fig. 11 shows a portion of the stem of the rising gate and the locking-bolt.

The plug 1 of the rotary-plug cock shown is ground into the plug-chamber of the body 2 in the usual manner. This plug is retained in position by a threaded washer 3, which is screwed into the body against a shoulder 4. It is desirable to place a parchment disk 5 between this washer and the shoulder in order to facilitate the turning of the plug. Between this washer and a washer 6, which is screwed into the body, is a packing 7. The packing is compressed between the two washers so as to pack the joints without forcing the plug too tightly into the body. At the outer end of the plug is a short stem 8.

In the outer part of the chamber in the body is a barrel 9. This barrel is held in place by a washer 10, over which the outer edge of the casing is turned. Across the inner end of the barrel is a groove 11, which receives the stem at the outer end of the plug so that the turning of the barrel will turn the plug.

A handle 12 is fastened to the outer end of the stem 13 of the barrel.

Extending from one side of the casing is a hub 14. In this hub is a common cylinder-lock 15. This lock is held in by a washer 16, over which the outer edge of the hub is turned. Extending inwardly from the inner end of the rotary cylinder of the lock is a bolt 17.

Two recesses 18 and 19 are preferably formed in the handle-barrel by drilling, and these recesses are connected by a slot 20. The bolt which projects from the inner end of the lock-cylinder is oblong in cross-section and the diameter of the recesses is equal to the longest diameter of the bolt, whereas the width of the slot is only equal to the shortest diameter of the bolt. When the lock is turned so that the bolt stands with its longest diameter longitudinally of the barrel, the barrel cannot be turned, for the bolt in this position is wider than the slot which connects the recesses. However, when the bolt is turned, by turning the lock-cylinder so that its longest diameter extends transversely of the barrel the barrel can be turned, for the slot is wider than the diameter of the bolt in this position.

With this construction when the key is turned so as to lie transversely the barrel can be turned back and forth ninety degrees by means of the handle for opening and closing the fluid-way. When the key is turned so as to lie longitudinally, the barrel cannot be turned whether the plug is opened or closed. With this construction the cock can be locked either open or closed and cannot be changed without the proper key.

If it is desired, instead of making the recess 19 circular it may be made of the same diameter as the width of the slot. In this case when the plug is turned so that the cock is opened it cannot be locked, for the key cannot be removed from the cylinder-lock until the plug is turned into closed position. With such a construction as this the key will always be in place in the cock when the cock is open, and thus the key will indicate that the cock is open and will be in place ready to lock the cock when it is shut.

When the invention is applied to a globe-valve, the bolt 21 of the lock 22 may extend completely across the casing 23. This bolt is oblong in section, and the spindle 24, which is provided with a handle 25 and is connected with the valve-disk 26, is made angular adjacent to the bolt. When the lock is turned so that the longest diameter of the bolt is parallel with the spindle, the spindle can be rotated for opening or closing the disk; but when the lock is turned so that the longest diameter of the bolt extends transversely the spindle cannot be rotated, but will be locked in whatever position it is in.

For locking the gate of a rising gate-valve the stem 27 of the gate 28 may be provided with a hub 29, having a recess 30, which is equal in diameter to the longer diameter of the bolt 31 of the lock-cylinder 32. A mortise may be made in the side of the hub through the recess of a width equal to the shorter diameter of the bolt. When the bolt is turned so that its greatest diameter is vertical, the gate can be lifted, the slot allowing the hub to pass the bolt. When the bolt is turned so that its greatest diameter is horizontal, the hub cannot be moved up, for the bolt is wider than the slot.

In all of these forms the cylinder-lock is arranged in an integral portion of the casing, and the lock-bolt is adapted to engage a part in the interior in such manner that the application of a wrench or other tool to the stem or spindle will not effect the opening of the valve.

The invention claimed is—

1. A fluid-controlling device having a casing, a valve adapted to open and close the fluidway through the casing, means for moving the valve, a cylinder-lock permanently secured in the casing, and a bolt connected with the lock, said bolt when in one position preventing the valve from being moved by the operating means and when in another position allowing the valve to be moved by the operating means, substantially as specified.

2. A fluid-controlling device having a casing, a valve adapted to open and close the fluid-way through the casing, means for moving the valve, a cylinder-lock permanently secured in the casing, and a bolt extending from the lock into a recess in a part of the valve-operating means, said bolt when in one position preventing the valve from being moved by the operating means and when in another position allowing the valve to be moved by the operating means, substantially as specified.

3. A fluid-controlling device having a casing, a valve adapted to open and close the fluid-way through the casing, means for moving the valve, a cylinder-lock permanently secured in the casing, and a rotary bolt extending from the lock into a recess in a part of the valve-operating means, substantially as specified.

4. A fluid-controlling device having a casing, a valve adapted to open and close the fluid-way through the casing, means for moving the valve, a cylinder-lock permanently secured in the casing, and a rotary bolt extending from the lock into a recess in a part of the valve-operating means, a portion of said recess being as wide as the greatest diameter of the bolt and a portion being only as wide as the smallest diameter of the bolt, substantially as specified.

5. A fluid-controlling device having a casing, a rotary plug adapted to open and close the fluid-way through the casing, means for holding the plug in position, means for rotating the plug, a cylinder-lock permanently secured in the casing, and a rotary bolt extending from the lock into a recess in the plug-rotating means, a portion of said recess being as wide as the greatest diameter of the bolt and a portion being only as wide as the smallest diameter of the bolt, substantially as specified.

EBENEZER HILL, Jr.

Witnesses:
E. HILL,
J. E. SLATER.